United States Patent
Lin et al.

(10) Patent No.: US 7,060,121 B2
(45) Date of Patent: Jun. 13, 2006

(54) METHOD OF PRODUCING GOLD NANOPARTICLE

(76) Inventors: Hsing Kuang Lin, 2143 Bridgewater Dr., Fairbanks, AK (US) 99709-4104; Daniel Edward Walsh, P.O. Box 73008, Fairbanks, AK (US) 99707

(*) Notice: Subject to any disclaimer, the term of this patent is extended or adjusted under 35 U.S.C. 154(b) by 350 days.

(21) Appl. No.: 10/607,674

(22) Filed: Jun. 25, 2003

(65) Prior Publication Data

US 2004/0261574 A1 Dec. 30, 2004

(51) Int. Cl.
B22F 9/24 (2006.01)

(52) U.S. Cl. .............................. 75/362; 75/365; 75/369

(58) Field of Classification Search ................. 75/362, 75/363, 365, 369
See application file for complete search history.

(56) References Cited

U.S. PATENT DOCUMENTS

| | | | |
|---|---|---|---|
| 6,228,334 B1 * | 5/2001 | Hill et al. | 423/25 |
| 6,686,308 B1 * | 2/2004 | Mao et al. | 502/180 |
| 2003/0216256 A1 * | 11/2003 | Axtell et al. | 502/417 |

OTHER PUBLICATIONS

H. Cai et al., 1998, Generation of metal nanoparticles by laser ablation of microspheres, Journal of Aerosol Science, vol. 29, No. 5-6, pp. 627-636, (Abstract only).

K. Esumi et al., 2000, Role of polyamodoamine dendrimers for preparing nanoparticles of gold, platinum and silver, Langmuir, vol. 16, No. 6, pp. 2604-2608, (Abstract only).

K. Esumi,et al., 2000, Spontaneous formation of gold nanoparticles in aqueous nanoparticles in aqueous solution of sugar-persubstituted polyamidoamine dendrimers, Langmuir, vol. 16, No. 6, pp. 2978-2980, (Abstract only).

F. Grohn et al., 2001, Nanoparticle formation within dendrimer-containing polymer networks: Route to new organic-inorganic hybrid materials, Macromolecules, vol. 34, No. 7, pp. 2179-2185, (Abstract only).

S. Ravaine et al., 1998, Photochemical generation of gold nanopa nanoparticles in Langmuir-Blodgett films, Langmuir, vol. 14, No. 3 No. 3, pp. 708-713, (Abstract only).

* cited by examiner

Primary Examiner—George Wyszomierski

(57) ABSTRACT

A method for producing gold nanoparticles is disclosed. When gold salt solution is mixed with an adsorbent, gold in the form of complexes is adsorbed onto the surface of the adsorbent. The gold-loaded adsorbent, after being separated from the solution by screening, filtration, settling or other methods, is ashed to form ashes. The ashes contain gold nanoparticles and impurities such as oxides of sodium, potassium and calcium. The impurities can be removed by dissolution using dilute acids. The relatively pure gold nanoparticles are obtained after the impurities are removed. Activated carbon or gold-adsorbing resin can be used as the adsorbent. Silver or platinum group metal nanoparticles can also be produced by this method.

3 Claims, 1 Drawing Sheet

METHOD OF PRODUCING GOLD NANOPARTICLE

DISCUSSION OF BACKGROUND ART

Gold has been used for connectors in electronic computational devices due to its good electrical and thermal conductivities. Its excellent oxidation resistance in most environments is also a key property, and another reason why the electronic computational industry selects gold as a conductor. As electronic devices are driven smaller and smaller, gold's properties become even more important. Consequently, gold nanoparticles could become one of the key elements in manufacturing nano-scale devices. Currently, gold nanoparticles have also been used as tags in biological research.

Several approaches have been made to generate gold nanoparticles. Gold nanoparticles were generated by reduction of gold complex ions in gold salt solution with $NaBH_4$, in the presence of dendrimers (Esumi et al., 2000; Grohn et al., 2001) or with sugar balls (Esumi et al., 2000). Ultraviolet irradiation of Langmuir-Blodgett films of octadecylamine, 4-hexadecylaniline and benzyldimethylstearylammonium chloride monohydrate deposited from aqueous $HAuCl_4$ subphases was tested to generate gold nanoparticles. (Ravaine et al., 1998). Cai et al. (1998) investigated the generation of gold nanoparticles by laser ablation of gold microparticles. These approaches are expensive and often involve pollution-generating processes.

SUMMARY OF THE INVENTION

The present invention is directed to a method for producing gold nanoparticles. Silver and platinum group metal nanoparticles can also be generated by the present invention. Platinum group metals include ruthenium, rhodium, palladium, osmium, iridium and platinum.

In the present invention, the method comprises the steps of mixing gold salt solution with an adsorbent to form a first slurry. Gold in the form of complexes is adsorbed onto the interior and exterior surfaces of the adsorbent during the mixing. The mixing continues until the majority of gold in the solution has been adsorbed. The gold-loaded adsorbent may be separated from the first slurry, for example, by screening, filtration or settling. The loaded adsorbent, after being separated from the first slurry, is ashed to generate ashes. The ashes contain gold nanoparticles and impurities such as oxides of sodium, potassium calcium and silicon. The impurities are preferably removed by dissolution using dilute acids. The relatively pure gold nanoparticles are obtained after the impurities are removed.

A preferred adsorbent is activated carbon or gold-adsorbing resin. A preferred gold solution is a solution containing at least one gold complex selected from the group consisting of gold cyanide, gold thiourea, gold chloride and gold thiosulfate complexes.

BRIEF DESCRIPTION OF THE DRAWING

The accompanying drawing, which is incorporated in and constitutes a part of the specification, schematically illustrates a preferred embodiment of the invention and, together with the general description given above and the detailed description of the preferred embodiment given below, serves to explain the principle of the invention.

DETAILED DESCRIPTION OF THE INVENTION

Figure 1:
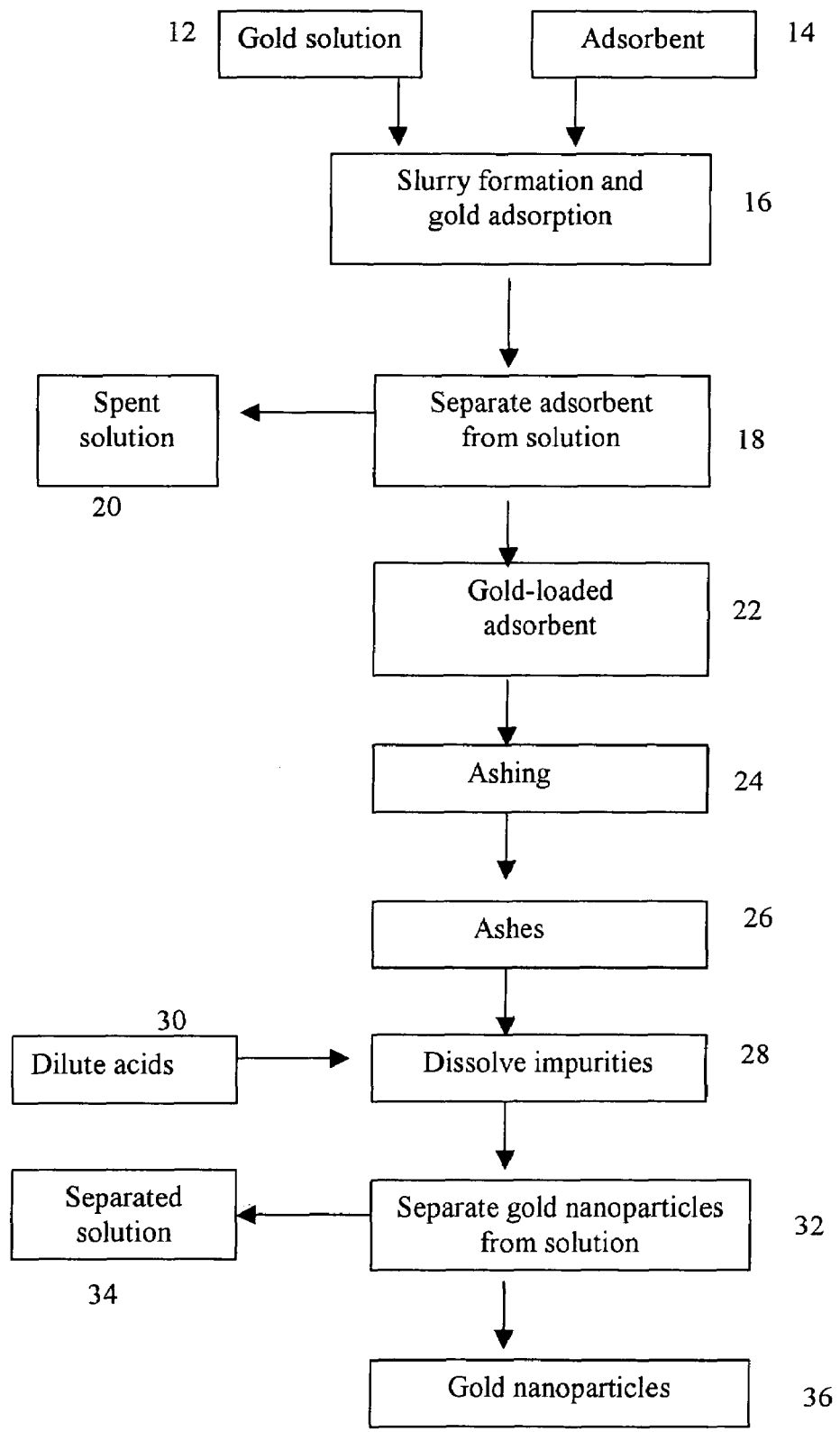
FIG. 1 is a flow chart schematically illustrating one preferred embodiment of the method of the present invention for generating gold, silver, and platinum group metal nanoparticles.

Referring to FIG. 1, the figure illustrates a preferred embodiment of the present invention for producing nanoparticles of gold. The gold salt solution (box 12) is mixed with an adsorbent (box 14) to form a slurry (box 16). The slurry preferably should be at least periodically agitated to enable the aqueous gold complexes be adsorbed by the adsorbent. Continuous agitation is preferred over periodic agitation. Activated carbon and resin are the preferred adsorbents. The use of other adsorbents or combinations of adsorbents, however, is not precluded. The preferred gold solution is a solution containing at least one gold complex selected from the group consisting of gold cyanide, gold chloride, gold thiourea, and gold thiosulfate complexes. The adsorption of gold by activated carbon or gold-adsorbing resin is very effective.

At the completion of gold adsorption (box 16), the gold-loaded adsorbent is separated from solution, for example, by screening, filtration or settling (box 18). The spent solution (box 20) is preferably used to prepare the gold complex solution (box 12). The loaded adsorbent (box 22) is treated by ashing processes (box 24), preferably conducted in muffle furnaces or fluidized-bed smelters. Ashes (box 26) are the product of ashing (box 24). The ashes contain gold nanoparticles and impurities such as oxides of sodium, potassium, calcium and silicon. The gold nanoparticles result from reduction of the gold complexes adsorbed on the adsorbent during the ashing step. A preferred method to remove the impurities is by dissolution (box 28). Oxides of sodium, potassium and calcium easily dissolve in dilute acids such as hydrochloric acid and nitric acid while silicon oxide dissolves in dilute hydrofluoric acid (box 30). Gold nanoparticles remain intact during the steps of dissolving the impurities using acids. At the completion of impurities dissolution, gold nanoparticles are separated from solution (box 32), preferably by centrifuge. The separated solution (box 34) is preferably used to prepare the dilute acids (box 30) or discharged, after treatments. The centrifuge product is the gold nanoparticles.

Activated carbon and gold-adsorbing resin have very large surface area and have been applied by mineral industry for gold extraction for many years. Gold is adsorbed, in forms of gold complexes, onto the interior and exterior surfaces of the activated carbon or resin forming monolayer or multiplayer films of gold complexes. When the gold-loaded adsorbent is ashed, the carbon in the adsorbent is combusted, generating a reducing environment. The adsorbed gold complexes are therefore reduced to metallic gold crystals. The gold crystals may sinter together with neighboring gold crystals to form larger gold particles if the gold loading on the adsorbent is high and the ashing temperature exceeds the sintering temperature of gold.

It should be noted, that those familiar with the art to which the present invention pertains, will recognize that activated carbon or resin has also long been effectively applied to the adsorption of silver and platinum group metals, and that adsorbed silver and platinum group metal complexes on the adsorbent behave similarly to that of gold during the step of ashing. Thus, the present invention can also be applied to producing silver and platinum group metal nanoparticles.

EXAMPLES

Example 1

Activated carbon was used as the adsorbent to adsorb gold from gold cyanide complex solution. At the completion of the adsorption, the loaded carbon contains 2.4 grams of gold per kilogram of carbon. The loaded carbon was ashed in a muffle furnace at 750 degrees Centigrade (° C.) for 4 hours. The resulting ashes were mixed with dilute acids to dissolve the impurities and gold nanoparticles were obtained as the centrifuge product. The gold nanoparticles were examined using a scanning electron microscope with energy-dispersed x-ray. The energy-dispersed x-ray is used to confirm the gold nanoparticles and the scanning electron microscope is used to examine the particle size and shape. It is clearly shown, from scanning electronic microscope images, that gold particles sinter together in this sample. The sintered gold particles range from 0.5 to 2 microns in size.

Example 2

Activated carbon was used as the adsorbent to adsorb gold from gold cyanide complex solution. At the completion of the adsorption, the loaded carbon contains 2.4 grams of gold per kilogram of carbon. The loaded carbon was ashed in a muffle furnace at 650° C. for 5 hours. The resulting ashes were mixed with dilute acids to dissolve the impurities and gold nanoparticles were obtained as the centrifuge product. The gold nanoparticles were examined using a scanning electron microscope with energy-dispersed x-ray. The sintering effect is much less severe in this sample (Sample 2) than in the Sample 1. The gold particle size ranges from 0.1 to 0.5 micron or 100 to 500 nanometers. The smaller gold particle size, compared to Sample 1, is expected, as the loaded carbon was ashed at a lower temperature, thus causing a less severe sintering effect.

Example 3

Activated carbon was used as the adsorbent to adsorb gold from gold cyanide complex solution. At the completion of the adsorption, the loaded carbon contains 0.18 grams of gold per kilogram of carbon. The loaded carbon was ashed in a muffle furnace at 650° C. for 5 hours. The resulting ashes were mixed with dilute acids to dissolve the impurities and gold nanoparticles were obtained as the centrifuge product. The sintering effect is less severe in this sample (Sample 3) than in the Sample 2. The test produced gold nanoparticles of about 50 nanometers. With a lower gold content in the loaded carbon, compared to Sample 2, the gold particles become smaller when gold cyanide complex is reduced and gold particles crystallize in the ashing step.

What is claimed is:

1. A method of generating nanoparticles of gold, silver or platinum group metals; the method comprising the steps of:
   (a) adsorbing dissolved species of gold, silver or platinum group metals onto an adsorbent, thereby producing a loaded adsorbent;
   (b) ashing the loaded adsorbent to produce ashes; and
   (c) removing impurities from the said ashes.

2. The method of claim 1 wherein said dissolved species include complexes of cyanide, chloride and thiourea.

3. The method of claim 1 wherein said adsorbent is selected from the group consisting of activated carbon and resin.

* * * * *